(12) United States Patent
Mitchell et al.

(10) Patent No.: US 7,539,310 B2
(45) Date of Patent: *May 26, 2009

(54) ENCRYPTION KEY UPDATING FOR MULTIPLE SITE AUTOMATED LOGIN

(75) Inventors: Christopher E. Mitchell, Sammamish, WA (US); Jeff C. Kunins, Seattle, WA (US); Max E. Metral, Boston, MA (US)

(73) Assignee: Microsoft Corporation, Redmond, WA (US)

(*) Notice: Subject to any disclaimer, the term of this patent is extended or adjusted under 35 U.S.C. 154(b) by 42 days.

This patent is subject to a terminal disclaimer.

(21) Appl. No.: 11/136,350

(22) Filed: May 24, 2005

(65) Prior Publication Data

US 2005/0216773 A1    Sep. 29, 2005

Related U.S. Application Data

(63) Continuation of application No. 09/594,304, filed on Jun. 15, 2000, now Pat. No. 6,950,522.

(51) Int. Cl.
*H04L 9/00* (2006.01)

(52) U.S. Cl. .................. 380/277; 713/172; 713/158; 726/9; 726/10; 380/280

(58) Field of Classification Search ......... 380/277–286, 380/44, 45, 200–201; 713/172, 189, 187, 713/190, 193, 156–158; 726/9, 10, 5, 18–20, 726/6, 26–30; 709/225, 229, 228, 227; 705/66, 705/67, 71; 725/25, 30, 31
See application file for complete search history.

(56) References Cited

U.S. PATENT DOCUMENTS

| | | | |
|---|---|---|---|
| 5,081,677 A | * | 1/1992 | Green et al. ............... 380/281 |
| 5,937,068 A | | 8/1999 | Audebert |
| 5,991,399 A | * | 11/1999 | Graunke et al. ............. 380/279 |
| 6,058,484 A | * | 5/2000 | Chapman et al. ............. 726/10 |
| 6,069,954 A | | 5/2000 | Moreau |
| 6,070,243 A | | 5/2000 | See et al. |
| 6,115,376 A | | 9/2000 | Sherer et al. |
| 6,167,521 A | * | 12/2000 | Smith et al. .................. 726/21 |
| 6,237,095 B1 | | 5/2001 | Curry et al. |

(Continued)

FOREIGN PATENT DOCUMENTS

EP    0 472 939 B1 *    7/1998

*Primary Examiner*—Kimyen Vu
*Assistant Examiner*—Nirav Patel
(74) *Attorney, Agent, or Firm*—Lee & Hayes, PLLC

(57) ABSTRACT

A version number is associated with an encrypted key executable to allow real time updating of keys for a system which facilitates users signing on to multiple websites on different domains using an encrypted ticket. Two keys may be used at each site during updating of keys, each having an associated one digit Hex version tag. When a key is to be updated with a new key, the existing or old key is provided an expiration time. A second key is provided from the system in a secure manner with a new version number and made the current key which provides decryption of the encrypted ticket. The system tracks both keys while they are concurrent. After the existing key expires, only the second, or updated key is used to provide login services for users. The system periodically flushes old keys.

9 Claims, 3 Drawing Sheets

U.S. PATENT DOCUMENTS

| | | |
|---|---|---|
| 6,295,361 B1 | 9/2001 | Kadansky et al. |
| 6,304,969 B1 | 10/2001 | Wasserman et al. |
| 6,345,347 B1 | 2/2002 | Biran |
| 6,367,013 B1 * | 4/2002 | Bisbee et al. ............... 713/178 |
| 6,381,696 B1 * | 4/2002 | Doyle ......................... 713/156 |
| 6,584,564 B2 | 6/2003 | Olkin et al. |
| 6,609,198 B1 * | 8/2003 | Wood et al. ................. 713/155 |
| 6,678,733 B1 | 1/2004 | Brown et al. |
| 6,950,522 B1 * | 9/2005 | Mitchell et al. ............. 380/280 |

* cited by examiner

ENCRYPTION KEY UPDATING FOR MULTIPLE SITE AUTOMATED LOGIN

RELATED APPLICATION

This application is a continuation of and claims priority to U.S. patent application Ser. No. 09/594,304, filed on Jun. 15, 2000, the disclosure of which is incorporated by reference herein.

FIELD OF THE INVENTION

This invention relates generally to the field of computers, and in particular to automatically updating keys used to log into multiple sites.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2000, Microsoft Corporation, All Rights Reserved.

BACKGROUND

The recent growth in popularity of the Internet has significantly increased the number of Internet users and the number of Internet sites (also referred to as "web sites"). Web sites may provide various types of information to users, offer products or services for sale, and provide games and other forms of entertainment. Many web sites require users to "register" by providing information about themselves before the web server grants access to the site. This registration information may include the user's name, account number, address, telephone number, email address, computer platform, age, gender, or hobbies. The registration information collected by the web site may be necessary to complete transactions (such as commercial or financial transactions). Additionally, information can be collected which allows the web site operator to learn about the visitors to the site to better target its future marketing activities or adjust the information provided on the web site. The collected information may also be used to allow the web site to contact the user directly (e.g., via email) in the future to announce, for example, special promotions, new products, or new features of the web site.

When registering with a web site for the first time, the web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medial records.

If a user visits several different web sites, each web site may require entry of similar registration information about the user, such as the user's name, mailing address, and email address. This repeated entry of identical data is tedious when visiting multiple web sites in a short period of time. Many web sites require the user to register before accessing any information provided on the web site. Thus, the user must enter the requested registration information before they can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character). Thus, Bob Smith must maintain a list of web sites, login IDs, and associated passwords for all sites that he visits regularly.

Some sites keep track of this login information for the user, and provide a key ring, which is essentially set of images or icons which when selected provide login information to a site associated.

There is a need for a secure way to log in to multiple sites. There is a further need to be able to change security parameters on sites without interrupting the user or site. There is yet a further need to manage security for multiple sites in a multiple site login service in a simple and uncomplicated manner.

SUMMARY OF THE INVENTION

New keys for decrypting automatic login information are distributed, and may coexist with a current key. Following a selected time, the new key becomes the current key.

During the period of coexistence of keys, a multiple site login service which issues the tickets begins to send tickets to the sites which may be decrypted by use of the new key. Following a period of time at least as long as the coexistence period, the old keys are expired and no longer available for use. A configuration file is used to keep track of sites logged into as well as a login ID and password for each site. As a site is visited by the user, the ticket is created from this information. Each key has a version tag associated with it. When an updated key is issued by the login service, the version tag is incremented or otherwise changed.

The site usually has a predetermined reauthorization period, after which each user is required to reauthenticate to the site again. The login service provides the ticket again for reauthorization. By setting the selected time for the new key to become the current key, all users currently logged into a site will not see a difference in operation. By the time the selected time passes, all users logged into the site will have already reauthorized using a ticket corresponding to the new key.

An individual site may request a new key, as may the login service. In one aspect of the invention, the login service generates a new key for a site to ensure that a minimum level of security of the site is maintained.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes a simple representation of a computer system and the operation of multiple computer systems on a network which implement different aspect of the current invention. This is followed by a description of the invention and how it is implemented.

Hardware and Operating Environment

Figure 1:
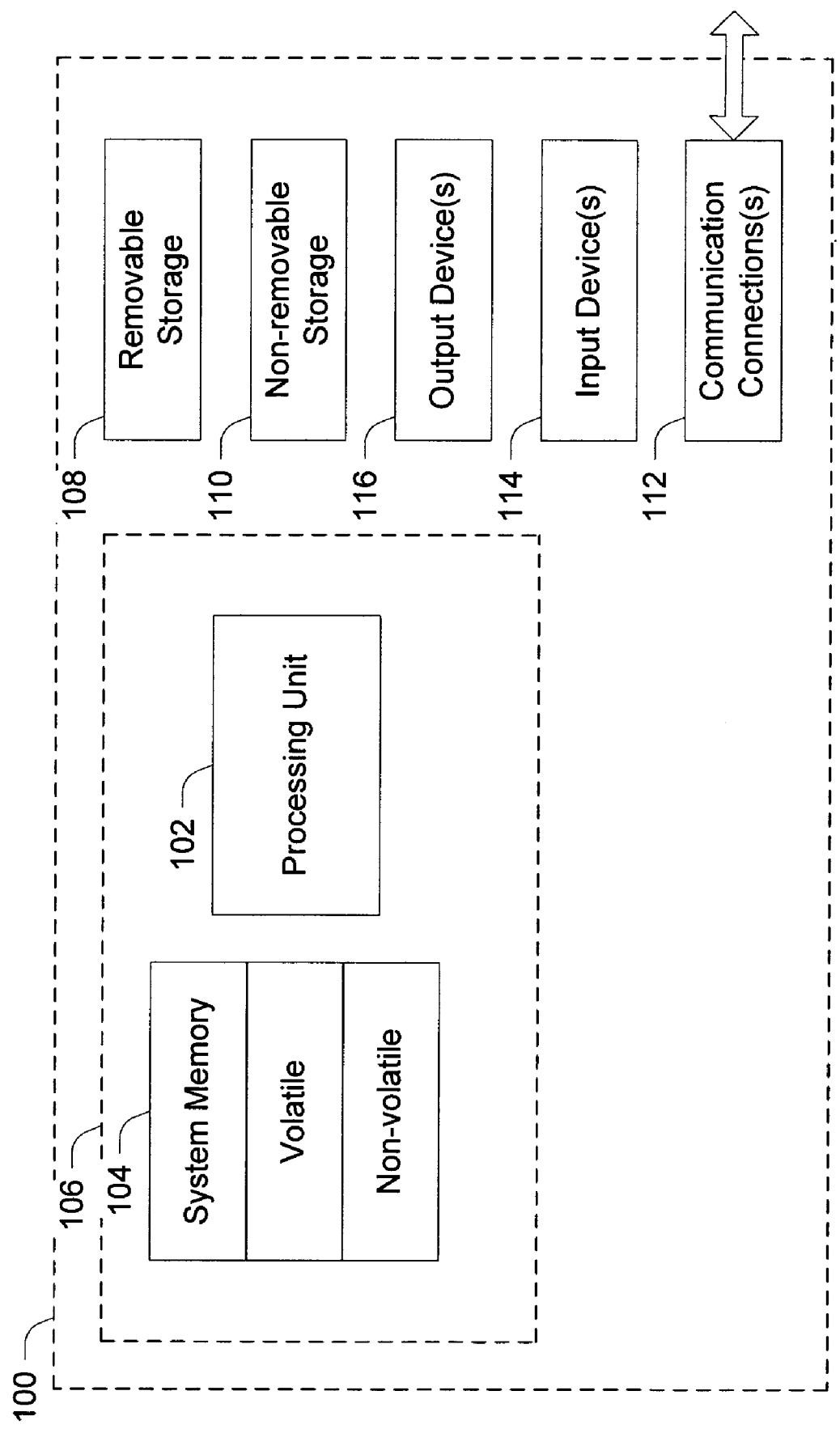
FIG. 1 is a block diagram showing pertinent components of a computer in accordance with the invention.

An exemplary system for implementing the invention includes a computing device, such as computing device 100 in FIG. 1. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by broken line 106.

Device 100 may also include additional features/functionality. For example, device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method of technology for storage of information such as computer readable instructions, data structures, program modules or other data. Memory 104, removable storage 108 and non-removable storage 110 are all examples of computer storage media. Computer storage media includes, but is not limited to RAM, ROM, EEPROM, flash memory or other memory technology, CD-ROM, digital versatile disks (DVD) or other optical storage, magnetic based storage or any other medium which can be used to store desired information and which can be accessed by device 100. Any such computer storage media may be part of device 100.

Device 100 may also contain communications connection(s) 112 that allow the device to communicate with other devices. Communications connection(s) 112 is an example of communication media. Communications media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct-wired connection, and wireless media such as acoustic, RF, infrared and other wireless media. The term computer readable media as used herein includes both storage media and communications media.

Device 100 may also have input device(s) 114 such as keyboard, mouse, pen, voice input device, touch input device, etc. Output device(s) 116 such as display, speakers, printers, etc may also be included. All these devices are well known in the art.

This invention may be described in the context of computer-executable instructions, such as program modules, executed by one or more computer or other devices such as device 110. Generally, program modules include routines, programs, objects, components, data structures, etc. that perform particular tasks or implement particular abstract data types. Typically the functionality of the program modules may be combined or distributed as desired in various embodiments.

Figure 2:
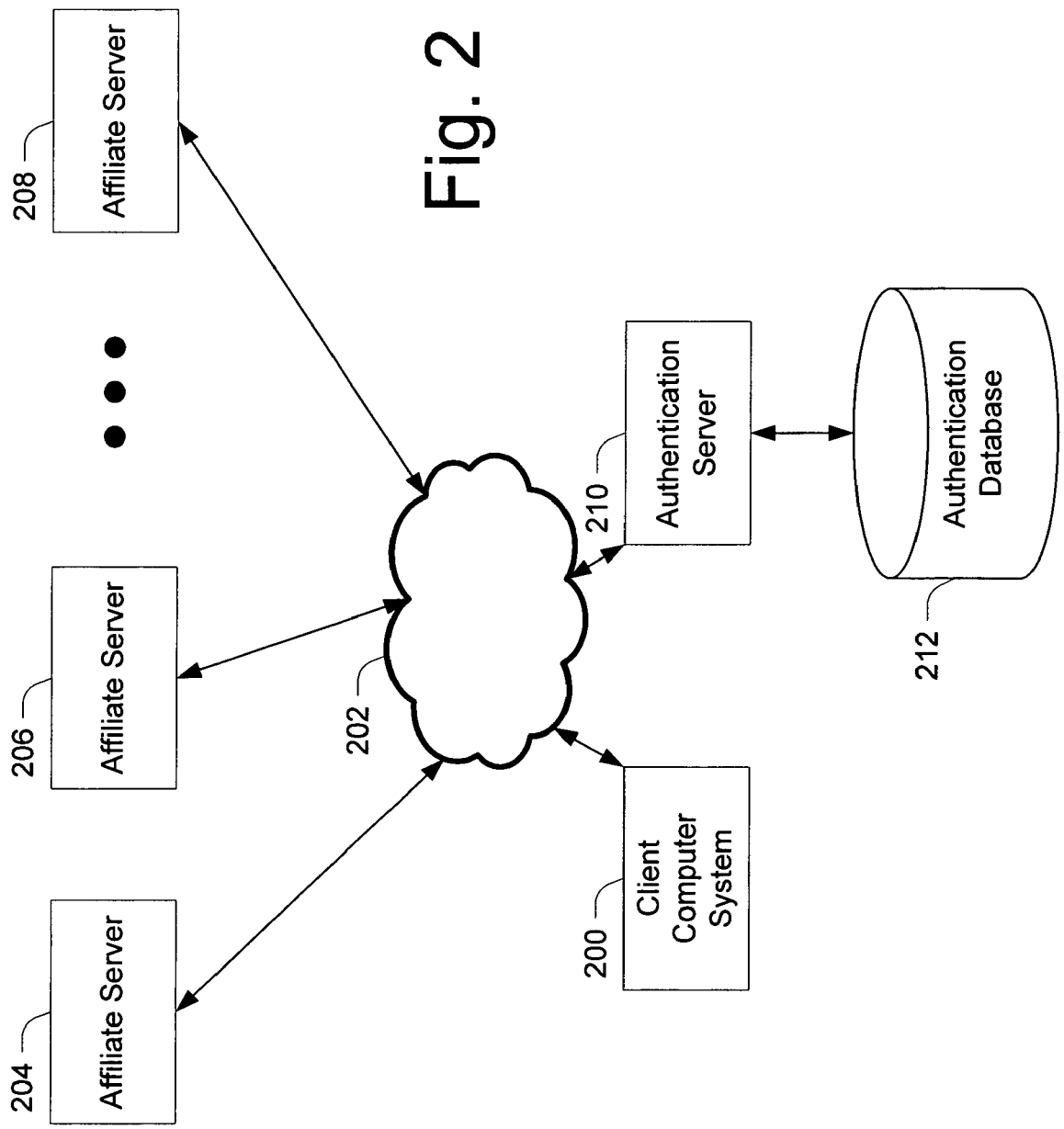
FIG. 2 illustrates an exemplary network environment in which the present invention is utilized.

FIG. 2 is a block diagram illustrating an exemplary network environment in which the present invention is utilized. A client computer system 200 is coupled to a network 202. In this example, network 202 is the Internet (or the World-Wide Web). However, the teachings of the present invention can be applied to any data communication network that implements a stateless protocol similar to hypertext transfer protocol, http. Multiple affiliate servers 204, 206, and 208 are coupled to network 202, thereby allowing client computer system 200 to access web servers 204, 206, and 208 via the network. Affiliate servers 204, 206, and 208 are also referred to as "web servers", "network servers" and "sites" hosting content such as text and images for access by other computers on the network 202. An authentication server 210 is also coupled to network 202, facilitating communication between the authentication server and client computer system 200 and authentication servers 204, 206, and 208. Although referred to as an "authentication server", authentication server 210 is also a web server capable of interacting with web browsers and other web servers. In this example, data is communicated between the authentication server 210, client computer system 200, and web servers using http, a protocol commonly used on the Internet to exchange information. An http specification is published by the Internet Engineering Task Force.

An authentication database 212 is coupled to authentication server 210. The authentication database 212 contains information necessary to authenticate users and also identifies which elements of user profile information should be provided to a particular affiliate server when the user accesses the affiliate server. Although the authentication database 212 is shown separately from the authentication server 210, in other embodiments of the invention, the authentication database is contained within the authentication server.

An authentication process authenticates a user of client computer 200 seeking access to an affiliate server 204, 206, or 208. The authentication server 210 authenticates the user of client computer 200 by requesting authenticating information, such as the user's login ID and password. If the user is successfully authenticated, then authentication server 210 generates an encrypted authentication ticket and communicates the ticket to the appropriate affiliate server. The authentication ticket indicates that the user is authenticated. Each affiliate server requires a key in order to decrypt the ticket and allow access by the user.

The authentication ticket contains two time stamps. The first time stamp indicates the last time that the user's login ID and password were physically typed by the user. The second time stamp indicates the last time that the user's login information was refreshed by the authentication server. This "refresh" of the user's login information can be performed "silently" or by manual entry of the login information (i.e., login ID and password) by the user. The refreshing of the user's login information is performed by the authentication server. Once completed, a new authentication ticket is issued to the affiliate server indicating the new time stamp values.

The term "affiliate server" is defined herein as a web server that has "registered" or established a relationship or affiliation with the authentication server 210. Each affiliate server 204, 206, and 208 includes a code sequence that allows the affiliate server to communicate with the authentication server 210 when a user (who is also registered with the authentication server) requests access to the affiliate server.

Prior to executing the authentication process, both the user of client computer system 200 and the operator of affiliate server 204 "register" with the authentication server 210. This registration is a one-time process which provides necessary information to the authentication server. The user of client computer system 200 registers by providing information such as the user's email address, password information, and various other information about the user or the client computer system if desired. As part of the user registration process, the user is assigned (or selects) a login ID, which is a common login ID used to access any affiliate server. The login ID may also be referred to herein as a "user name" or "login name". Additionally, the user selects a password associated with the login ID which is used for authentication purposes.

After registering and logging into the authentication server, the user can visit any affiliate server (i.e., affiliate servers that are also registered with the same authentication server) without requiring any additional authentication and without re-entering user information that is already contained in the associated user profile.

The operator of affiliate server 204 registers with the authentication server 210 by providing information about the affiliate server (e.g., server name and internet address). Additionally, the affiliate server provides information regarding its authentication requirements. The authentication requirements can be specified as the maximum time allowed since the last login and entry of authentication information by the user as well as the maximum time allowed since the last "refresh" of the authentication information by the user. Refreshing the authentication information refers to the process of having the user re-enter the password to be certain that the appropriate user is still operating the client computer system. This periodic refreshing of authentication information is useful if the user leaves their computer system without logging out of the authentication server, thereby allowing another individual to access affiliate servers using the login ID of the previous user. If a user requests access to the affiliate server after the maximum time allowed, then the user is re-authenticated (i.e., refreshed) by the authentication server by issuing a new authentication ticket either silently or with required reentry of password as described above. Thus, although there is a central authentication server, each individual affiliate server can establish its own authentication requirements which are enforced by the authentication server. After registering with the authentication server, the affiliate server can use the authentication server to authenticate any user that has also registered with the authentication server.

Figure 3:
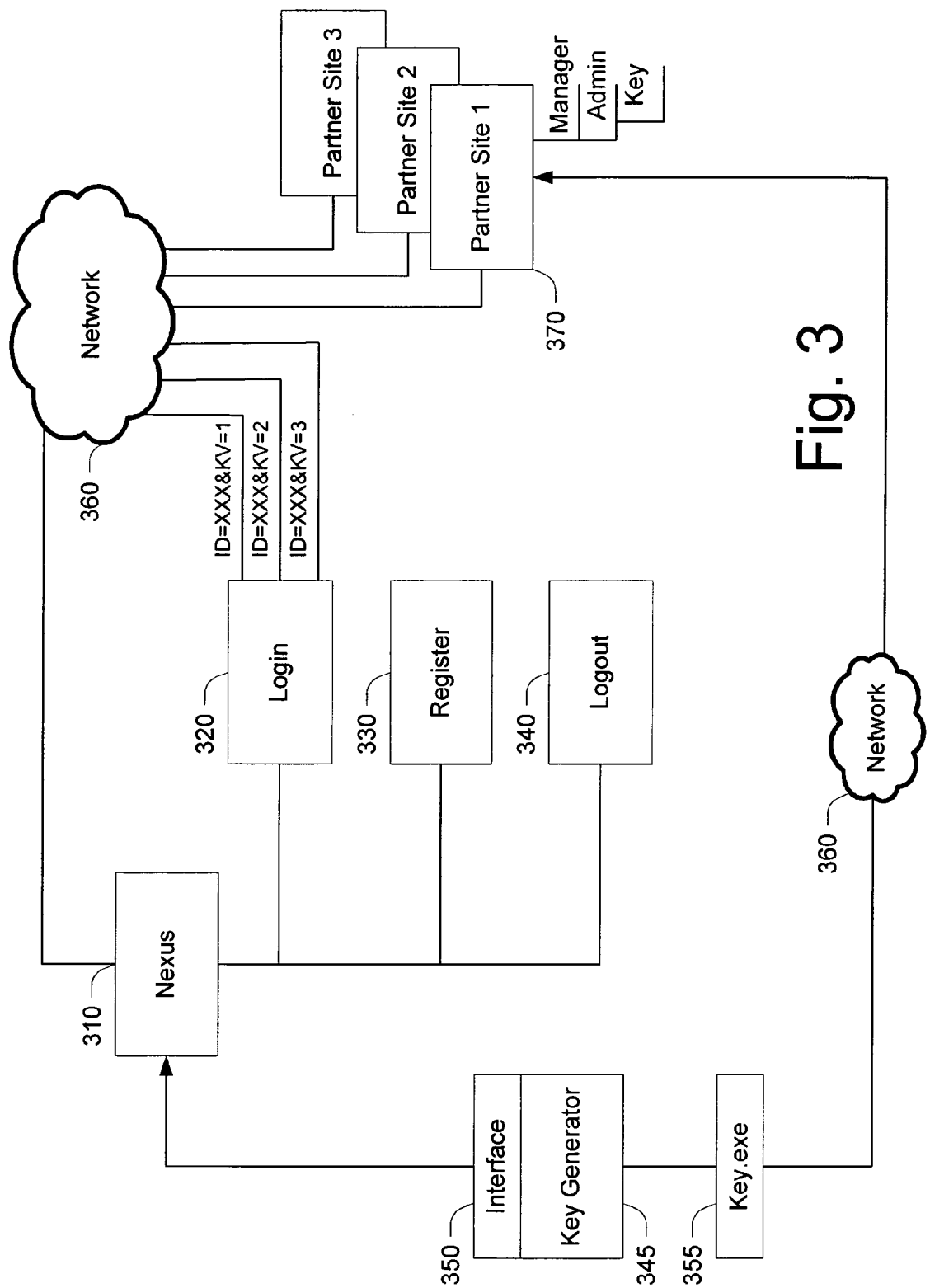
FIG. 3 is a block diagram showing components involved in key generation, distribution, updating and use.

A block diagram showing the general operation of key generation and distribution for decrypting tickets is provided in FIG. 3. The authentication server has several servers associated with it. A nexus server 310 manages a configuration file, which contains information regarding partner sites in the form of a partner.xml, information about keys in a keys.xml, and information about the network server in a networkserver.xml in the configuration file. These XML files are each a component configuration document (CCD). Further associated servers include a login server, which provide login services, a register server, and a logout server. Each of these servers may be integrated into a single server, or comprise multiple servers themselves.

A key generator 345 is also associated with the authentication server. It has an administrative interface 350 that allows selection of new keys by a user, and provides keys in the form of an executable piece of code referred to as key.exe via a network 360 (shown in two places for convenience) such as the Internet, to one or more affiliate servers such as a partner site 370. Partner site 370 may have several servers operating as indicated in FIG. 3, all servicing the same network domain. The key generator also provides the keys.xml information to the nexus, where it is stored in the configuration file.

When a new partner site is registered by use of the register server 330, a key is generated for the site and provided by S-MIME secure encrypted email, using standard certification, or physically mailed to operators of the site for installation. The key is delivered as an EXE with key data embedded within it. An object, such as a COM object handles installation and encryption of the keys. The first key has a version number, such as "1", and is stored by the site in encrypted form in a registry using a piece of information that is specific to the physical machine, such as the MAC address of the first network card. The key.exe is used for decrypting tickets while the authentication server is still running.

The administrative interface 350 is used to cause generation of a new siteID for the new partner site, and generation of the key for that site with a one digit Hex version tag or number of "1". Other lengths of version numbers may used as desired. Interface 350 updates the nexus server 310 with information about the partner, such as site ID, keys.xml and current version number. Since there may be multiple trusted servers, i.e.: login servers, each is then triggered to refresh configuration information from the nexus server 310, including the new keys.xml file with the new site's key version "1" included. The keys are distributed as a distinct private secure CCD in clear text over a highly secure (128-bit SSL) channel that is both client and server authenticated. Each time the CCD is retrieved by a trusted server, all the keys are immediately encrypted and stored in a registry, and then the CCD is completely thrown away.

When a new key is to be updated, telephone or email is used to initiate the generation of a new key. Such generation could also be automated if desired. The key may be updated on a regular schedule or variable schedule when initiated on the authentication server side, or may be initiated in accordance with various security protocols on either the authentication server side or partner site side. The partner site administrators may request a new key when an employee leaves, or any time desired.

A new key is then generated at 345 and is updated on the nexus server 310 to add the new key to a list of keys for the partner's siteID in the configuration file. The version number is incremented. When it reaches "F", it loops back to one and resumes incrementing over time.

Key generator 345 also generates a key.exe file that can be installed on the partner site servers. The new key.exe file is sent securely to the partner and received. The key.exe file is then run against all servers on the partner site with an "/addkey" parameter that installs the new key onto the server while still running. It is added as an additional key with no expiration date.

Next, the partner site runs the key.exe file against all servers with a "/makecurrent" parameter to make the new key the current key by switching a registry key referred to as keycurrent to the new key version. The registry may also take the form of a config file, or any file in other systems. It also sets an expiration date on the previous current key equal to the current time plus a registry key value referred to as TimeWindow. Time window may be set equal to the reauthorization time, or any other desired time. It may also be set to zero to immediately begin exclusive use of the new current key to access the partner site. If no time window has been set, old keys are flushed every 24 hours or so if desired.

Key.exe may also be run against all servers using an "/expire" parameter prior to receiving a new key to cause a service interruption until new keys are installed. This ensures that no new tickets using an old compromised key are accepted, and the old key can be immediately deleted from all servers.

The manager at each site 370 uses several registry keys to keep track of encryption keys. A SiteID is the partner site's ID and is used in all calls to the authentication server. A TimeWindow is essentially the site's default preference for how "fresh" a user's ticket must be before they are redirected back to the login server for a new key. KeyData contains the actual keys, encrypted in the HMAC of the machine. Each encryption key is stored as a value of this registry key, with the version stamp as the value's name, and the encrypted key data as the value's data. These values map one to one with values under KeyTimes. KeyTimes specifies the expiration dates of all the keys referenced in KeyData. For each encryption key, this registry key will contain a value whose name is the encryption key's version stamp, and whose data is the date and time at which this key is no longer valid. The value "−1" signifies that the key never expires. Typically, keys are set to never expire until it is time to update the key. CurrentKey is the version stamp of the current key. The version stamp is referenced in all requests to authentication servers. It indicates which key this server expects to get new tickets in.

When there is a new key, users that are currently logged on will be able to continue their session using the old key. When KeyTimes expires, they must use the new key to reauthorize their session. When this happens, or when a new user attempts to log in with an older version ticket after key.exe has been run with MakeCurrent, the partner site receives an attempt to log in by the user using the old ticket. When parsing a ticket with an expired key, it is rejected, the user gets redirected to the login server URL with parameters "ID=xxx&KV=2" used to specify the new encryption key. The user is redirected by this URL to the login server. This redirection causes the login server to update the configuration file to indicate that the new key is now the current key.

A new ticket is generated using the new key. As each new user or reauthorization request is received for that site, the new current key will be used to generate the ticket. In its unencrypted form, the ticket sent by the user comprises authentication time stamps and user information. When encrypted, it takes the form of: "keyversion#, string", where the string is an encrypted form of the timestamps and user information.

CONCLUSION

The key generation and distribution process provides a safe, reliable way of distributing keys to partner sites that requires minimal human intervention, little if any user disruption, and minimal operational disruption. While parts of the process have been described in terms of human operations, these operations may be easily automated. In the same manner, automated operations may also be performed by human actions. The process allows two keys to be operative for a desired amount of time.

We claim:

1. A method of managing keys used to decrypt tickets for authenticating with a website, the method comprising:
receiving a first key with a first version number;
encrypting the first key using a hardware address of an end user device;
changing a current key variable to the first version number to identify the first key as a current key;
setting a time for the first key when the first key is no longer accepted by the website, wherein the time is set to a reauthorization time determined by the website;
receiving a second key with an incremented version number;
encrypting the second key using a hardware address of the end user device, the hardware address used to encrypt the second key being either a same or a different hardware address than the hardware address used to encrypt the first key; and
identifying the second key as the current key, wherein the first and second keys comprise key data and executable code for decrypting tickets, wherein the first and second keys are sent to the website from an authentication server, wherein the first and second keys are concurrently valid for the website for a coexistence period, and wherein each ticket comprises (1) a timestamp corresponding to when an end user last provided authenticating information and (2) a timestamp corresponding to when the authentication server last refreshed the authenticating information of the end user with the website.

2. The method of claim 1 wherein a user currently logged in uses the first key until the time expires.

3. The method of claim 1 wherein a user may only use a ticket corresponding to the second key when the second key is made the current key.

4. The method of claim 1 wherein a user using a previous version ticket will be redirected to obtain a ticket corresponding to the second key following the second key being identified as the current key.

5. The method of claim 1 wherein the second key is identified as the current key by changing the current key variable to the second version number, and wherein the first key and second key are distributed as distinct private secure XML in clear text over at least SSL channel of 128-bit security that is both client and server authenticated.

6. The method of claim 1 wherein the hardware address is an HMAC value of the end user device.

7. The method of claim 1 wherein the first key is stored as a value of a registry key and the second key is stored as a value of another registry key.

8. The method of claim 7 wherein a name of the registry key is a version number of the first key and a name of the another registry key is a version number of the second key.

9. A computer readable medium having instructions stored thereon for causing a computer to perform a method of managing keys used to decrypt tickets for logging onto a website, the method comprising:

receiving a first key with a first version number;

encrypting the first key using a hardware address of the end user device;

changing a current key variable to the first version number to identify the first key as a current key;

setting a time for the first key when the first key may no longer be used, wherein the time is set to a reauthorization time determined by the website;

receiving a second key with an incremented version number;

encrypting the second key using a hardware address of the end user device; and identifying the second key as the current key, wherein the first and second keys comprise key data and executable code for decrypting tickets, wherein the first and second keys are sent to the website from the authentication server, wherein the first and second keys are concurrently valid for the website for a coexistence period, and wherein each ticket comprises (1) a timestamp corresponding to when an end user last entered authenticating information and (2) a timestamp corresponding to when an authentication server last refreshed the authenticating information of the end user.

* * * * *